(12) United States Patent
Trossen et al.

(10) Patent No.: US 7,142,876 B2
(45) Date of Patent: Nov. 28, 2006

(54) LOCATION DEPENDENT SERVICES (75) Inventors: Dirk Trossen, Cambridge, MA (US); Dana Pavel, Cambridge, MA (US)

(73) Assignee: Nokia Corporation, Espoo (FI)

( * ) Notice: Subject to any disclaimer, the term of this patent is extended or adjusted under 35 U.S.C. 154(b) by 288 days.

(21) Appl. No.: 10/638,477

(22) Filed: Aug. 12, 2003

(65) Prior Publication Data

US 2004/0176103 A1   Sep. 9, 2004

Related U.S. Application Data

(60) Provisional application No. 60/450,701, filed on Mar. 3, 2003.

(51) Int. Cl.
*H04Q 7/20* (2006.01)
(52) U.S. Cl. .................... 455/456.3; 455/456.1
(58) Field of Classification Search ............. 455/461, 455/456.3, 414.1, 456.1; 342/457, 387; 705/64; 709/227; 380/270
See application file for complete search history.

(56) References Cited

U.S. PATENT DOCUMENTS

2003/0035544 A1* 2/2003 Herle et al. .............. 380/270
2003/0187803 A1* 10/2003 Pitt ............................ 705/64
2003/0210186 A1* 11/2003 Sollenberger et al. ...... 342/387
2003/0222819 A1* 12/2003 Karr et al. ................ 342/457
2003/0225893 A1* 12/2003 Roese et al. .............. 709/227
2004/0038689 A1* 2/2004 Holur ...................... 455/461

FOREIGN PATENT DOCUMENTS

EP   1 130 933 A1   9/2001
EP   1 164 804 A1   12/2001

* cited by examiner

*Primary Examiner*—George Eng
*Assistant Examiner*—Phuoc Doan
(74) *Attorney, Agent, or Firm*—Squire, Sanders & Dempsey L.L.P.

(57) ABSTRACT

A service provider entity includes a communication interface for communication with user equipment and for receiving location information from a plurality of different communication systems. The service provider entity further includes a processor for processing the received location information for determining the location of user equipment subscribing to the service provider entity and for providing services for the subscribing user equipment based on the determined location of the user equipment. A service can also be provided for the user in accordance with a registration if a check indicates that at least one condition that triggers providing the service and registered at the service providing entity is met.

20 Claims, 4 Drawing Sheets

LOCATION DEPENDENT SERVICES

CROSS REFERENCE TO RELATED APPLICATIONS:

This application claims priority of U.S. Provisional Patent Application Ser. No. 60/450,701, entitled "Location Dependent Services," filed on Mar. 3, 2003, the contents of which are hereby incorporated by reference.

BACKGROUND OF THE INVENTION:

1. Field of the Invention

The present invention relates to providing services for user equipment, and in particular, to providing location dependent services to user equipment adapted for communication via a communication system.

2. Description of the Related Art

A communication system is a facility that enables communication between two or more entities such as user terminal equipment and/or networks entities and other nodes associated with the communication system. The communication may include, for example, communication of voice, electronic mail (email), text messages, data, multimedia and so on. The communication system can be used for providing the users thereof with various types of services.

The communication may be provided via fixed line and/or wireless communication interfaces. A feature of the wireless communication systems is that they provide mobility for the users thereof. Examples of communication systems providing wireless communication include the public land mobile network (PLMN) and wireless data networks such as the Wireless Local Area Network (WLAN). Examples of the fixed line systems include the public switched telephone network (PSTN) and various fixed line data networks.

A communication system typically operates in accordance with a given standard or specification which sets out what the various elements of the system are permitted to do and how that should be achieved. For example, the standard or specification may define if the user, or user equipment is provided with a circuit switched service or a packet switched service or both. Communication protocols and/or parameters which shall be used for the connection are also typically defined. For example, the manner of how communication shall be implemented between the user equipment and the elements of the communication network is typically based on a predefined communication protocol. In other words, a specific set of "rules" on which the communication can be based on needs to be defined to enable the user equipment to communicate via the communication system.

Each communication system operates by running various different functions. The functions of various communication systems have been developed quite independently from each other. Thus it is possible that two communication systems such as two different communication networks handle a function in a different manner. For example, different and non-compatible protocols may be used for providing service in different communication systems.

An example of the wireless communication systems is a cellular or mobile communications system. The cellular communication system is a communication system that is based on use of radio access entities and/or wireless service areas. The access entities are often referred to as cells. A characteristic feature of the cellular systems is that they provide mobility for the users of the communication system. Hence they are often referred to as mobile communication systems. Examples of cellular communications systems include standards such as the GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access), TDMA/CDMA (Time Division Multiple Access/Code Division Multiple Access) in UMTS (Universal Mobile Telecommunications System), IMT 2000, i-Phone and so on.

In a cellular system, a base transceiver station (BTS) provides a wireless communication facility that serves mobile stations (MS) or similar wireless user equipment (UE) via an air or radio interface within the coverage area of the cell. As the approximate size and the shape of the cell is known, it is possible to associate the cell to a geographical area. The size and shape of the cells may vary from cell to cell. Several cells may also be grouped together to form a larger service area. A base station may provide more than one cell.

The cellular network apparatus and/or the mobile station can be employed for providing location information of the mobile station and thus the user. The location information can be utilized to provide of other services for the mobile users. Such location-based services are seen as one important trend in the future provision of service.

In an application the cells or similar geographically limited service areas and associated controller nodes facilitate the cellular communications system to produce at least a rough location information estimate concerning the current geographical location of a particular mobile station. If the location of the cell is known, it is possible for the system to conclude based on this information the geographical area in which a given mobile station communicating in said cell is likely to be at a given moment. This information may be provided also when the mobile station is located within the coverage area of a visited or "foreign" network. The visited network may be capable of transmitting location information of the mobile station back to the home network, e.g. to support location services or for the purposes of call routing and charging.

A mobile station itself may also be provided with appropriate equipment to provide information on which the positioning of the mobile station can be based on. The mobile station may communicate the information via the base to an appropriate network element that may use the information in a predefined manner.

More accurate location information may be obtained based on various location estimation methods, e.g. based range difference (RD) measurements or by means of an external location information service, for example, a satellite based system such as those referenced by the names 'Global Positioning System' (GPS) or 'Galileo'. The measurements may be accomplished at the mobile station or by a number of base stations.

In the context of providing location information regarding a mobile user subscribing to a mobile communication network, the location information has been provided by means of a location service functionality associated with the mobile communication network. The location service functionality may be provided by a network element (e.g. a location server) of the mobile communication network. The network element then receives location information from one or more sources in the mobile communication network. If the service entity receives only an indication of the present cell (e.g. the cell ID), and no further computations and/or approximations are made, this would give the location to an accuracy of one cell, as it would indicate that the mobile user equipment is (or at least was) within the coverage area of a certain cell.

Systems and services allowing tailoring of a provided service based on the user's location are already known. In intelligent network (IN) based solutions certain IN functionalities, such as call forwarding or call barring, can be triggered based on information concerning the location of a specific user. Another example is present in the GSM systems, wherein local SMS messages can be provided, e.g., for advertisement purposes, upon entering a particular area. The triggering can be based on user's subscription to certain services and his/her current location.

More dynamic applications such as tracking of a mobile user can also be implemented. These can be used, for example, for providing traffic information while the user is driving a car. As a regulatory required service, location-dependent emergency number (e.g. 911 in the USA) calls apply user's location information, too.

A common feature to these solutions is that they are bound to certain operators or systems, and rely on dedicated network functionality, such as Intelligent Network (IN) signaling or the cellId information in the GSM.

It is becoming more important to be able to provide the services seamlessly such that the service provided may cross access network, operator, vendor, and even terminal boundaries. Due to the increasing importance of providing seamless service, which may also be referenced to by the term 'multidimensional heterogeneity', the existing network- and system-bound solution will not suffice for these new requirements.

The location services may be used to incorporate important information about the current context of a user, namely his or her current location, in the provided information. Apart from taking into account the user's location, the inventor has found that it might be desirable to be able to consider information that is associated with certain actions such as call screening or content providing or other services that are based on available network resources when offering location-based services. For example, it might be advantageous if the availability of certain localized streaming content (e.g., an advertisement video) and appropriate transcoding functionality in the network at a certain location could be used as a trigger for a mobile user to initiate a streaming application at said location with the help of the transcoder. The transcoder may be required since the access may take place in a location wherein only a bandwidth-constrained technology is available.

Conventionally, subscriptions for location based services need to be made through specific systems, such as by means of IN or using the SMS facility of the GSM. The specific systems may be such that they cannot interoperate. Thus the triggered actions are usually restricted to certain functionality, e.g., call control in IN based systems or SMS notifications in the GSM.

One proposal has been an alerting mechanism that is provided in access routers as described in U.S. patent application Ser. No. 10/295,626, wherein the Inventor of the present invention is a co-inventor. In this arrangement, the user equipment subscribes to certain attributes and receives a notification if the current access router or any other geographically adjacent router supports the required attribute. However, this method relies on the availability of such data in each access router. This requires a mechanism known as a capability exchange among the access routers in order to enable the shared data access. This may not always be appropriate. The proposed arrangement may also result in substantial signaling load on the signaling channels between the access routers.

SUMMARY OF THE INVENTION

Embodiments of the present invention aim to address one or several of the above problems.

According to one embodiment of the present invention, there is provided a service provider entity including a communication interface for communication with user equipment and for receiving location information from a plurality of different communication systems. A processor processes the received location information for determining the location of user equipment subscribing to the service provider entity and provides services for the subscribing user equipment based on the determined location of the user equipment.

According to another embodiment of the present invention there is provided a method of providing location dependent services for a user. The method includes communicating a request for a location dependent service from the user equipment to a service provider entity that is operated independently from the communication network the user equipment subscribes to. Entity information is received at a service provider from a plurality of different communication systems. The received information for determining the location of the user equipment for providing the location dependent service for the user equipment based on the determined location of the user equipment and the request for the location dependent service.

In accordance with a more specific form the service provider entity includes a memory for storing information pushed from the plurality of communication systems.

The communication interface may be adapted to handle messages in accordance with at least one of the following communication protocols: File Transfer Protocol; Session Initiation Protocol; User Datagram Protocol; Internet Control Message Protocol; Simple Network Management Protocol.

The processor may be adapted to trigger a predefined action in response to a predefined result of the determined location and a service subscription by the user equipment. The predefined result may indicate a change in the location of the user equipment and/or that the user equipment is within a certain area. The processor may also be adapted to check if the current location of the user equipment matches a subscription for services. The subscription may define at least one trigger condition and at least one location area. Furthermore, the processor may be adapted to initiate an action in response to detection that a trigger condition is met.

Information regarding the location of the user equipment may be generated at the user equipment and/or at a communication system serving the user equipment.

The user equipment may include a mobile station subscribing to a mobile communication network.

According to a further embodiment of the present invention there is provided a method of providing a service for a user of user equipment. The user equipment can be adapted for communication via a communication system, the method includes registering in a service provider entity information regarding at least one condition that triggers providing the service for the user. The service provider entity can be arranged for reception of location information regarding user equipment from a plurality of sources. The service provider receives entity information associated with the location of the user equipment. The current location of the user equipment is determined at the service provider entity based on said received information. The service provider entity verifies if the at least one condition that triggers providing the service is met. The service for the user is provided in accordance with the registered information.

According to a still further embodiment of the present invention there is provided a location service entity for providing location dependent services for a user of user equipment. The user equipment can be adapted for communication by a communication system, the location service entity includes: A database enables the user to register information regarding at least one condition that triggers providing the service for the user. Interface for receives location information regarding the user equipment from a plurality of sources associated with different communication systems. A processor determines the current location of the user equipment based on the received information, for verifying if the at least one condition triggering the provision of service is met, and provides the service for the user in accordance with the registered information.

In other embodiments a trigger condition may include information associated with the availability of a certain network resource. The certain network resource may include one of the following features: the used access technology; the available streaming playout buffers; the available transcoder resources. A trigger condition may include information associated with the availability of a certain localized content.

In another embodiment a subscription message can be sent from the user equipment. The message can contain first information that regards the service condition the user equipment subscribes to, second information that regards the validity of the condition and third information that regards the action that shall be taken if the first and second information match information otherwise available for the service provider entity. In an alternative embodiment a subscription message can be sent from the user equipment. The message can contain first information that regards the service condition the user equipment subscribes to, second information that regards operator specific location area and third information that regards the action that shall be taken if the first and second information match information otherwise available for the service provider entity. In both cases the three information elements can be matched against information stored in the service provider entity.

The registration process may include sending of a Session Initiation Protocol message from the user equipment. A Session Initiation Protocol message may also be sent to the user equipment as an indication that a condition is met.

The embodiments of the invention may enable users to access location dependent services independently from the specific access technology used by the particular users. Thus architecture-independent deployment is enabled. Deployment may be implemented outside of operator's realm. Furthermore, the invention does not rely on capabilities that are exchanged among access routers. This is advantageous since it is uncertain whether this kind of exchange of capabilities will be standardized for and/or deployed in access routers.

The support for the abovementioned multi-dimensional heterogeneity can be achieved through a service provider model wherein an independent third party service provider serves the users. This model can provide location-dependent services independent from the specific operators. The operators only provide the resources for providing the service.

In a further embodiment the users may subscribe to location-specific resources defined through location and trigger condition parts of a subscription. A certain predefined action may then be triggered upon matching the subscription with the current location. Hence, a user may subscribe to location-dependent information, in general independent of the particular operator and technology, and trigger actions upon matching the current location with the subscription. The trigger conditions, e.g., location-dependent resources and content, are preferably only restricted by the information provided by the operators. The attraction of new customers and/or traffic in the networks is seen as an incentive for the operators to provide the data. It is thus possible that the offered spectrum of conditions would become rather wide.

advantage is that the performed actions might describe more complex actions and are therefore not restricted to certain functionality, such as in IN systems. This may allow for more complex actions to be triggered upon availability of certain functionality.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENT(S)

The following describes providing location-dependent services in more detail by way of examples in relation to mobile user equipment. It shall be appreciated that terms such as mobile station or mobile node are often used for denoting such user equipment.

In general, in one embodiment of the present invention a service provider entity is provided that can be run independently from any particular communications network operator, physical network and/or access technology. An advantage of the external service provider is that multi-dimensional heterogeneity can be provided.

Figure 1:
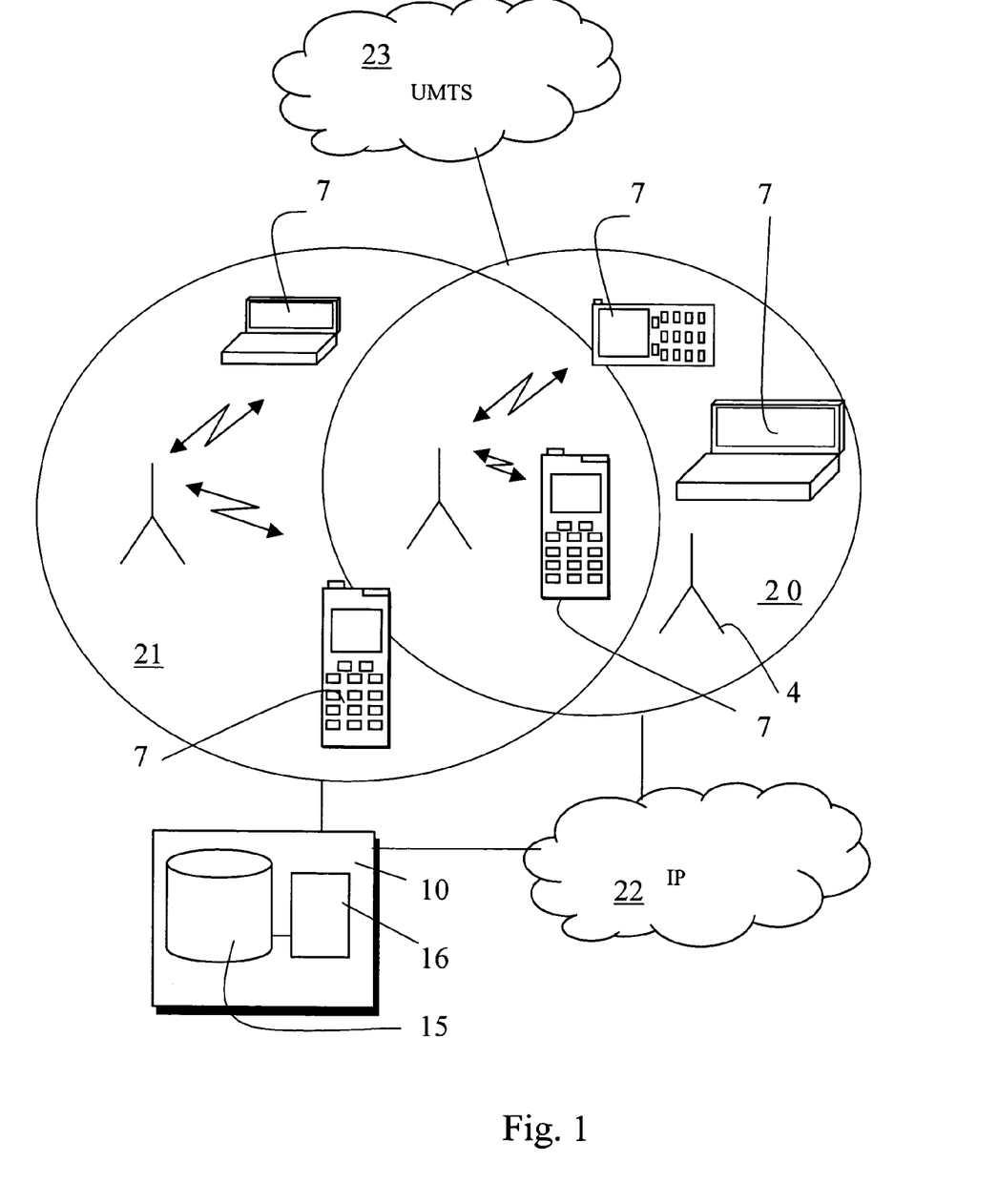
FIG. 1 shows a system including a plurality of communication networks in which the embodiments of the present invention may be employed.

Reference is first made to FIG. 1 showing schematically an arrangement including different communication systems 20 to 23 in which the present invention may be employed. As shown, the arrangement may include a set of different networks and/or operators 20 to 23. It shall be appreciated that while the following makes, for the sake of simplicity, references to different networks, the invention shall be understood in the context of different communication systems. The difference between the systems may be based on differences between the operators, the used communication standards and/or protocols, access techniques or any other factor, which may effect the interoperation between two communication systems. It shall also be appreciated that an operator may own and manage more than one network, the different networks employing e.g. different access techniques and being based on different standards.

Figure 2:
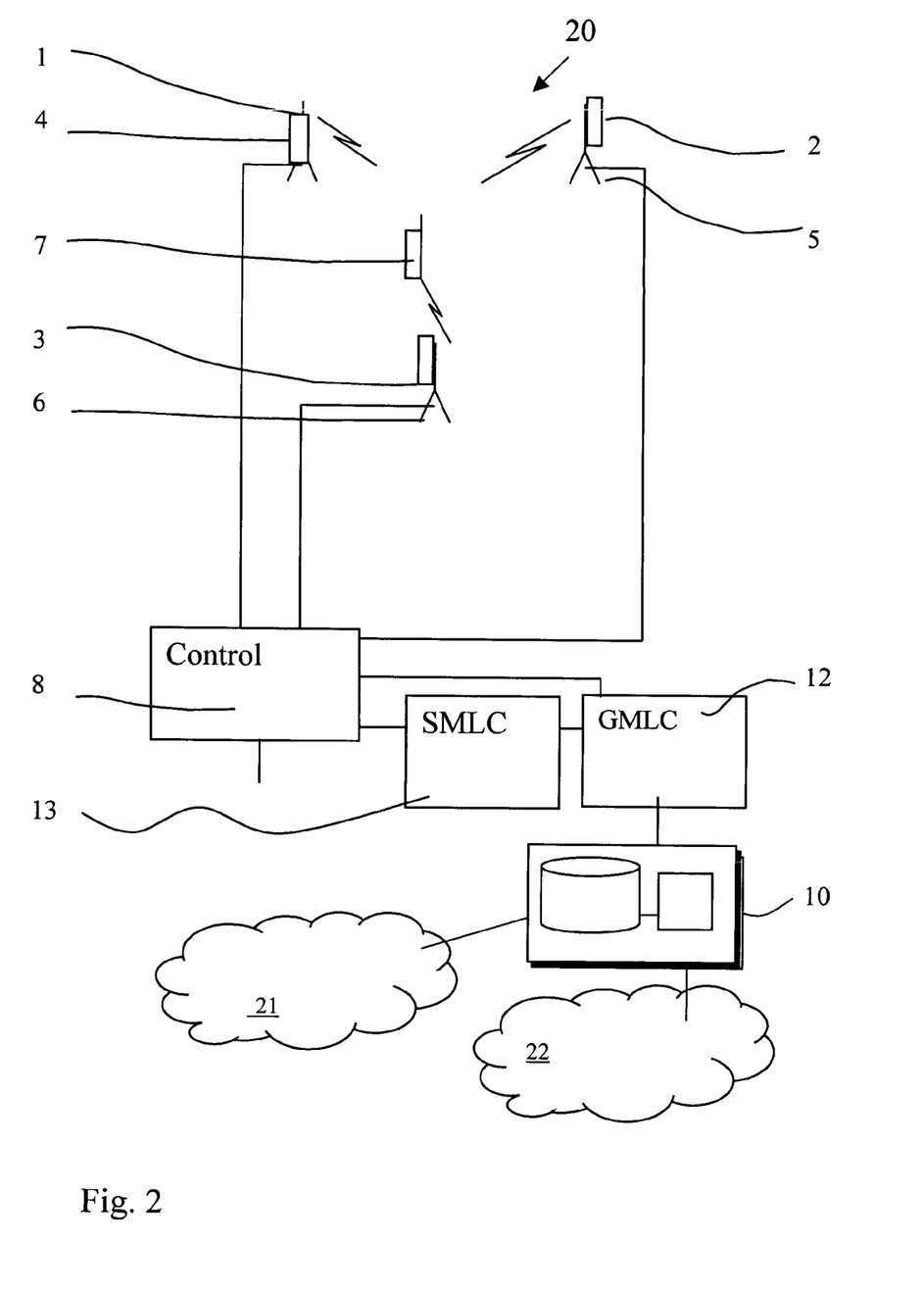
FIG. 2 is a schematic presentation of the location information determination apparatus of a communication system.

Before explaining the preferred embodiments of the invention in more detail, a reference is made also to FIG. 2, which is a simplified presentation of some of the components of a cellular system. More particularly, FIG. 2 shows an arrangement in which three base stations 4, 5 and 6 provide three radio coverage areas or cells of a cellular telecommunications network.

Each base station 4 to 6 is arranged to transmit signals to and receive signals from the mobile user equipment (UE) such as mobile station (MS) 7 via wireless communication. Likewise, the mobile station 7 is able to transmit signals to and receive signals from the base stations. It shall be appreciated that although only one mobile station 7 is shown in FIG. 1 for clarity, a number of mobile stations may be in communication with each base station.

The mobile station telecommunications networks provide mobility for the users thereof. In other words, the mobile station 7 is able to move from one cell coverage area to another cell coverage area. The location of the mobile station 7 may thus vary in time as the mobile station is free to move from one location (base station coverage area or cell) to another location (to another cell) and also within one cell.

It shall be appreciated that FIG. 2 is highly schematic and that in practical implementations the number of base stations would be substantially higher. One cell may include more than one base station site. A base station apparatus or site may also provide more than one cell. These features depend on the implementation and circumstances.

Each of the base stations 4 to 6 can be controlled by an appropriate controller function 8. The controller function may be provided by any appropriate controller. A controller may be provided in each base station or a controller can control a plurality of base stations. Solutions in which controllers are provided both in individual base stations and in the radio access network level for controlling a plurality of base stations are also known. It shall thus be appreciated that the name, location and number of controller entities depends on the system. For example, a UMTS terrestrial radio access network (UTRAN) may employ a controller node that is referred to as a radio network controller (RNC). In the GSM a corresponding radio network controller entity is referred to a base station controller (BSC). It is also noted that typically more than one controller is provided in a cellular network.

In this specification, controllers are denoted by the controller element 8 of FIG. 1. The controller 8 may be connected to other appropriate elements, such as to a mobile switching centre (MSC) and/or a serving general packet radio service support node (SGSN), via a suitable interface arrangement. However, as these do not form an essential part of the invention, the various other possible controllers are omitted from FIG. 2 for clarity.

The communication system also includes means for providing location information. For example, FIG. 2 shows a location services (LCS) node 12, for example, a gateway mobile location center (GMLC), of the communication system providing location services for authorised clients. In general terms, a location services node can be defined as an entity capable of providing client applications with information concerning the geographical location of a mobile station. There are different ways to implement the location services node, and the following will discuss an example that employs the gateway mobile location center (GMLC).

The gateway mobile location center (GMLC) 12 can be arranged to receive via appropriate interface means predefined information concerning the geographical location of the mobile station 7. In addition to the information associated with the geographical location, the information provided for the GMLC 12 may include the identity (such as an international mobile subscriber identifier: IMSI) or a MSIDSN (a mobile subscriber integrated digital services number) or a temporary identifier of the mobile station 7.

The location information may be provided for the GMLC 12 by means of another location services node such as a serving mobile location center (SMLC) 13. The SMLC 13 can be seen as an entity that functions to process location measurement data received from the network in order to determine the geographical location of the mobile station. The location measurement data may be provided by various elements associated with the network such as means of one or several location measurement units 1 to 3 provided in association with at least some of the base stations 4 to 6 and/or the mobile station 7.

The information from the various location measurement means associated with the network can be processed in a predefined manner by the SMLC 13. Information regarding the location of mobile user equipment may then be provided to the GMLC 12. An authorized client, such as the location service provider entity 10 of the present invention, can then be served by the GMLC 12.

The serving location service node or SMLC 13 may be implemented in the radio access network or the core network. If the serving location service node is implemented in the radio access network it may be in direct communication with the access network controller function 8 and the location services node or GMLC 12. In some applications, the SMLC 13 may be a part of the access network controller function. If the serving location service node is implemented in the core network it may then be arranged to receive the location measurement data from the radio network, for example, via the access network control function 8.

Another possibility is to provide at least a part of the location information by means of an external location determination system such as a positioning system based on use of location satellites. A well-known example of these is the Global Positioning System (GPS). Another proposed satellite based systems is known by the name Galileo. In the conventional mobile location services the mobile stations would be provided with a GPS receiver. The mobile station would then provide the location information to appropriate location service entity of the network, such as the GMLC 12 or the SMLC 13.

It shall be appreciated that the above explanation is given only to clarify the operation of one possibility for providing location information by means of a cellular system. The way the location service architecture is arranged in the individual communication system can be an implementation issue, and not essential to the operation of the present invention. The various other possibilities will thus not be explained in more detail.

Returning now to FIG. 1, a plurality of user equipment 7 adapted for communication via the different networks is shown. As with the networks, the skilled person is familiar with the features and operation of a typical mobile user equipment. Therefore these do not need any detailed explanation. It is sufficient to note that the user may use the mobile user equipment 7 for tasks such as making and receiving phone calls, for receiving and sending data from and to the network and for experiencing, for example, multimedia content presented by means of the display and/or the speaker and for interactive correspondence with another party. The user equipment may include an antenna element for wirelessly receiving and transmitting signals from and to base stations of the mobile communication network. The mobile user equipment may also be provided with a display for displaying images and other graphical information for the user of the mobile user equipment. Speaker means are also typically provided. The operation of the mobile user equipment may be controlled by means of an appropriate user interface such as control buttons, voice commands and so on. Furthermore, mobile user equipment is provided with a processor entity and a memory means. Some of the user equipment may operate in different networks, as, for example, multimode user equipment.

FIG. 1 shows also a service provider entity 10. The entity can include, for example, a server that is run and managed by an independent third party service provider. The service provider entity 10 may include known components such as a database 15 and a processor 16 for providing the required location data storage and processing functions as described below in more detail.

The service provider entity 10 also includes appropriate interface means for receiving information from the different networks 20 to 23. Such interfaces are known to the skilled person. The interface may be provided by means of simply downloading information from an operator server. A possibility for this is to use the File Transfer Protocol (FTP). The information may also be transferred, for instance, by User Datagram Protocol (UDP), Internet Control Message Protocol (ICMP), or Simple Network Management Protocol (SNMP) messages. Simple text files may also be used for the transfer of such information.

The communication interface of the service provider entity 10 can communicate with the user equipment 7 and also for receiving information from the communication systems 20 to 23 regarding the location of the user equipment. The processor 16 processes the received information for determining the location of at least one of the user equipment. Service applications for providing services for the user equipment based on the determined location can also run on the processor 16.

The service provider entity 10 of the present invention acts as a broker between network operators and mobile users. The service provider entity 10 can be adapted for tracking of the current location of a particular mobile user equipment. This may necessitate authorization and authentication of the service provider to obtain the mobile users location information. Those mobile users who want to use the services provided by the service provider entity 10 need to have a subscription relation with the provider of the service.

Known methods like Area Event Service can be utilised in the embodiments. In the Area Event Service the mobile, the SIM card or the network may monitor and send a trigger if the mobile enters, leaves, or is within, a certain defined geographical area. In the embodiments of present invention, the location is tracked by the service provider entity 10 rather than by any element of the network. The location tracking may be done by either asking for location information from the user equipment or by obtaining the location elsewhere, for example, from the location service note of SMLC 13 of the network 20.

The service provider entity 10 may also be arranged to perform more sophisticated operations such as matching of location and condition information with data that has been obtained from the operators through service level agreements. Such a further embodiment will now be described in more detail with reference to FIGS. 3 to 5.

Figure 3:
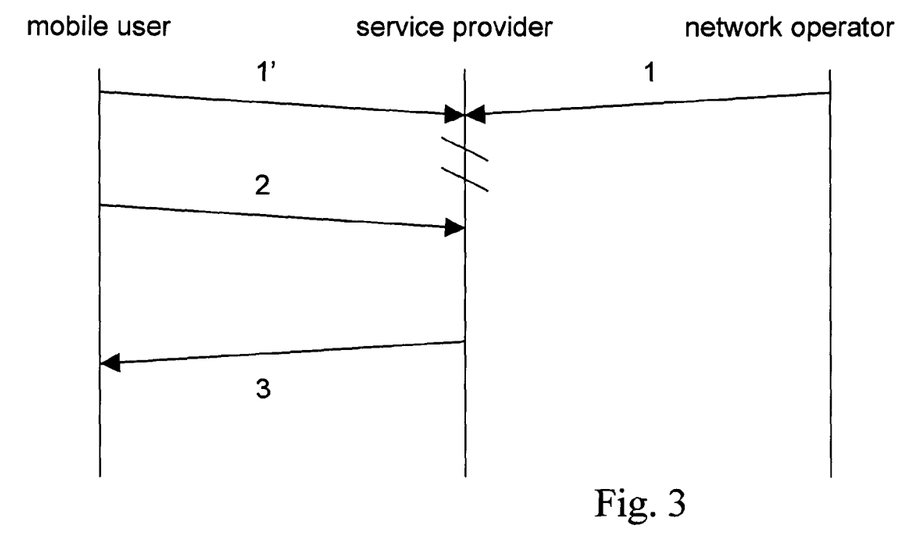
FIG. 3 is a signaling flow chart for communication in accordance with an embodiment.
Figure 4:
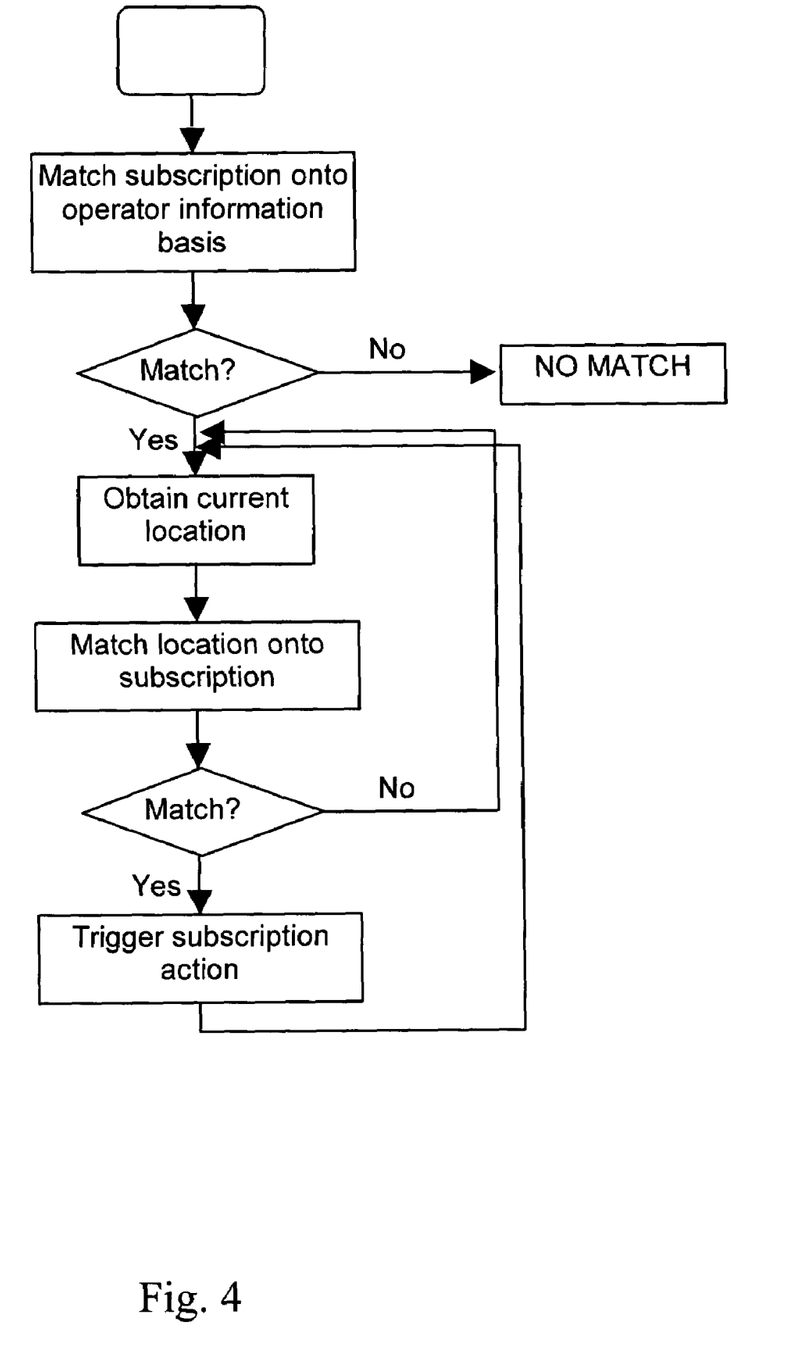
FIG. 4 is flowchart illustrating the operation of one embodiment of the present invention.
Figure 5:
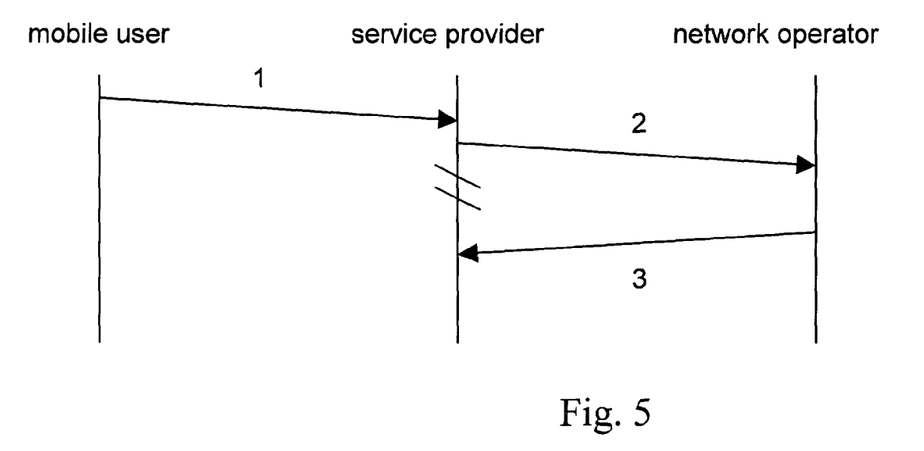
FIG. 5 is a signaling flowchart for a part of the operations in accordance with the FIG. 4 embodiment.

In this embodiment, the service provider entity 10 may trigger associated service providing actions upon matching the current location of a user equipment with a subscription for services. For this purpose, the location data is registered together with associated trigger conditions and trigger actions with the memory or database 15 of the third party service provider entity 10. If the current location of the mobile user equipment 7 to which the registration is associated matches the defined location in the subscription, together with the associated trigger conditions, the defined actions are taken by the service provider entity 10.

Examples of location information that may be used include Geographical information generated by the location service (LCS) of the communication systems, CellIds from the GSM system, and IP addresses of access routers in IP environments. However, it shall be appreciated that these are examples only and that any information that the third party service provider entity may use for determining the location of user equipment can be used in here.

Examples of trigger conditions include, among others the availability of certain network resources, such as particular access technologies, streaming playout buffers, transcoders, or availability of certain localized content.

Examples of appropriate trigger actions include, among others, actions such as sending a pre-defined message to the mobile user, or establishing a push of information, for example, localized content, to the mobile user.

The required information for matching the subscription data, such as location and trigger conditions, is provided by network operators that have appropriate service level agreements (SLAs) with the service provider.

The required information might also be provided through mobile users that have service providing contracts with the service provider. The provided information, either through operators or mobile users, is matched against the existing subscriptions with the service provider. If there is a match, the appropriate trigger actions (defined in the subscription) are executed.

Furthermore, the mobile user may also send a subscription for triggers with the service provider entity 10. The service provider entity performs a match of location and available resources with the subscription and triggers if match is positive.

The mobile user equipment may provide information regarding network resources at certain locations. For that, the mobile user equipment has to have the capability of storing information about the network resources at certain locations, and it has to have a trust relationship with the service provider. This trust relationship can be obtained, for example, during the service establishment between the service provider and the mobile user, for example, through the explicit subscription to the service.

In a more detailed analysis of a possible implementation of the further embodiment, providing location dependent services can be divided into two parts, namely the providing the location information and the tracking/matching part.

FIG. 3 shows the messages for the information providing part. The foundation of the service is the database 15 within the service provider entity 10. The database contains information regarding, for example, resources at a certain location. The information may include of triples that have the form:

(attribute, operator-specific location information, geographical coverage area)  (1)

Of the three information elements, the attribute element can be used in matching against information such as subscribed trigger conditions. The attribute element may denote features such as communication resources, the type of the content provided within the defined location or any other information that affects the service provided and might be used as a trigger. Examples of the trigger conditions will be described in more detail below.

The operator-specific location information element is for denoting the location for which the attribute is valid. The location information is typically expressed as an operator-specific notation. Thus, the location information element usually depends on the access technology. Examples of the operator specific notations include GSM cell identifiers (cellId) or wireless local area network (WLAN) access point identifiers.

The information element referred to as 'geographical coverage area' can be used in matching a subscription of a mobile user onto the current locations of the mobile user. The matching can be done independently of the operator-specific location information.

The abovementioned information required for the matching operations may be obtained by the service provider entity 10 in various manners. A possibility is that the network operators provide the information, for example, by means of operator push using message 1 in FIG. 3. The mobile user equipment may also send the required information. This is denoted by the mobile user push message 1' in FIG. 3. The push message 1' is sent while the mobile user equipment is roaming within the particular coverage area that is specified in the triple. In the latter case, the mobile user equipment is capable of determining its own geographical location. This may be provided, for example, based on the GPS or a location service of the network operator the user equipment subscribes to.

Since the mobile user's position only represents a geographical point rather than a coverage area, the service provider might use procedures such as stochastic averaging of data from several mobile users to relate the data to a coverage area. However, the exact techniques being used for such analysis are not essential for the operation of the present invention, and are thus not explained in any greater detail.

Since it is possible for the service provider entity 10 to support a set of different network operators and obtain information from a set of different mobile users, messages 1 and 1' may be sent independently by each network operator or mobile user, respectively, to provide the information. Furthermore, it shall be appreciated that messages 1 and 1' are not necessarily restricted to a single message rather to a set of messages, for example, for each information element as defined above. It is also possible that information for any of the information elements is updated at any time by re-sending messages 1 or 1' for the appropriate location. Moreover, it shall be appreciated that the exact nature as well as format of the information and the messages 1 and 1' are not essential for the operation of the invention. Either proprietary or standardized representation formats might be used for these purposes.

The second step of the information providing part deals with the subscription for a certain trigger condition at a certain location by the mobile user. For that, the mobile user sends, at a certain point in time, a subscription message 2 in FIG. 3. The subscription message may contain the following information triple:

(condition, geographical coverage area, action) (2)

In this triple, the information element 'condition' may denote resources or content the mobile user is subscribing to within the defined coverage area. The element 'geographical coverage area' is for denoting the geographical coverage area for which the attribute given in the condition element is valid. The coverage area does not rely on specific operator-dependent location information, such as the cellId.

The information element 'action' denotes the action to be performed if the condition and coverage area of the subscription positively match onto available information within the service provider and the current location of the user equipment. This action may be any appropriate action to be taken, such as sending a notification to the user equipment or initiating a certain service.

It is also possible for the user equipment to subscribe to conditions at locations that are specified using operator-specific location information. For that, the user equipment replaces the geographical coverage area in the above triple (2) with an operator-specific location information such as the GSM cellId or other operator dependent service are consisting of several cells of a defined area. This results in a triple (condition, operator-specific location information, action) (3)

The subscription data is appropriately stored within the service provider entity 10. In the tracking/matching part of this embodiment the subscription data is matched against the existing information triple (1) and the current location of the mobile user equipment. This will be described in the following.

The user equipment may send several subscriptions within one message rather than sending individual messages. Furthermore, the exact nature as well as format of the information and the message are not essential for the operation of this invention. Any appropriate messaging protocol may be used for this purpose.

The service provider responds to message 2 in FIG. 3 by sending message 3 back to the mobile user equipment with a result code of the subscription.

In accordance with a possibility, at least a part of the required messaging is based on the Session Initiation Protocol (SIP). The Session Initiation Protocol (SIP) is an application-layer control protocol for creating, modifying and terminating sessions with one or more participants (endpoints). SIP was generally developed to allow for initiating a session between two or more endpoints in the Internet by making these endpoints aware of the session semantics. A user connected to a SIP based communication system may communicate with various entities of the communication system based on standardised SIP messages. User equipment or users that run certain applications on the user equipment are registered with the SIP backbone so that an invitation to a particular session can be correctly delivered to these endpoints. To achieve this, SIP provides a registration mechanism for devices and users, and it applies mechanisms such as location servers and registrars to route the session invitations appropriately. Examples of the possible sessions include Internet multimedia conferences, Internet telephone calls, and multimedia distribution. A more detailed description of the SIP is from an Internet Engineering Task Force (IETF) specification by J. Rosenberg et al titled "SIP: Session Initiation Protocol", RFC 3261, July 2002. This document is incorporated herein by reference.

Thus message 2 in FIG. 3 may be a Session Initiation Protocol (SIP) SUBSCRIBE message. Such a message is defined in IETF document RFC 3265, "Session Initiation Protocol (SIP)-Specific Event Notification", July 2002 by A. Roach. This document is also incorporated herein by reference. The protocol defined in the RFC 3265 relates to a SIP event framework providing an IP-based event delivery mechanism. The requested event package would be specific for this purpose. The SIP message may be named accordingly, for example, "location trigger". The message body of the SIP SUBSCRIBE message would contain the appropriate triple, as defined in triples of information elements (2) and (3) above.

If SIP is used for the messaging, message 3 in FIG. 3 could be a "200 OK" message, as defined in the above referenced document RFC 3265. The SIP "200 OK" would be sent in case of a positive result by the service provider. Otherwise, an appropriate SIP error code would be returned as message 3.

Other messaging protocols are also possible. For example, any of the messages may be sent based on protocols such as the Internet Control Message Protocol (ICMP), Simple Network Management Protocol (SNMP) or User Datagram Protocol (UDP).

The second part of this embodiment is shown in more detail in FIG. 4, and includes location tracking and matching the location onto the subscription. For that purpose the service provider entity may execute a matching functionality that applies available data in the above information element triples. The matching may be performed upon receiving a subscription from the user equipment through the information providing part as described above.

If the subscription is given as in the information element triple (2), the service provider may first match the geographical coverage area given by the user in the information element triple (2) with internal operator data. The internal operator data may be given through the information element triple (1).

If the subscription is given as in the information element triple (3), the service provider may match the operator-specific location information in the information element triple (3) received from the user with internal operator data that is given through the information element triple (1).

In both of these cases, if there is no match, for example, there is no operator information available for the particular location, no further matching of the current user equipment location is necessary. Note that in this case, the actual location tracking is not necessary, as the location tracking in both occasion can be skipped. This can also be indicated to the user equipment by using an appropriate error code in message 3 of FIG. 3.

If there is a match, the current user equipment location is obtained and matched against the subscription. If the current location matches, the appropriate action, defined in the subscription, is initiated.

Note that this matching is preferably performed for each subscription. If at least one subscription matches positively onto the operator information basis, tracking the current location of the user equipment is initiated. For that, two different modes can be defined to realize the location tracking. More particularly, the tracking can be based on location determinations by the user equipment and/or determination based on information from a location service.

In the user equipment based location tracking mode, the mobile user equipment is responsible for obtaining its current location and sending this information to the service provider. For that, the mobile user equipment might use information obtained by its access technology, such as the current cellID, or it might use other sources of information, such as the GPS.

If the current location of the user equipment changes, the user equipment sends a notification to the service provider. The notification may contain the new operator-dependent location information. The notification preferably also includes information about the actual format of the location information.

In the location service provider based location tracking mode, the user equipment typically needs to authorize the service provider to track its location with the current network operator the user equipment is attached to. The location service provider subscribes to the current location of the user equipment after successful authorization by the network operator. The current location of the user equipment is then delivered to the service provider upon changes in the location.

FIG. 5 shows the messages for the location service provider based tracking. Message 1 is sent by the user equipment to authorize the service provider to track its location. For that, the user equipment may provide a token that can be used for authorization of the service provider with the network operator. This authorization token is used by the service provider in message 2 to subscribe to the location of the user equipment. At a certain point in time, the network operator sends location updates as notifications to the service provider (message 3 in FIG. 5). The authorization may need to be repeated if the user equipment undergoes a handoff to another operator.

Upon receiving the current location of the user equipment, the service provider entity 10 appropriately stores this information to be used in the matching steps, such as those shown in FIG. 4.

If SIP messaging is used for the signaling, as described above, the trigger action would at least be comprised of sending a SIP NOTIFY message to the user. The SIP NOTIFY is also defined in the above referenced IETF RFC 3265. If the user defined further actions apart from sending a notification, such actions are taken at the service provider entity 10 in addition to the notification.

On the mobile user's end, the embodiment can be integrated on the application level, since it is the particular application that desires the availability of the conditions and the triggered actions.

Information that originates from the network operator may be provided by means of the network management system since the management systems already typically use the same data. A particular network management system needs to be provided with an appropriate mechanism for forwarding this information to the service provider entity 10. The forwarding is preferably a push type operation.

The service provider entity 10 can be realized as an application running in an external party. The external party is assumed to have a trust relationship with the mobile user and also with the network operators. However, the service might also be provided directly through a network operator. This could be useful in particular for multi-access operators to increase operator's network usage.

The further embodiment may provide various advantages. For instance, a mobile user may be triggered to initiate a streaming content application (for example, an advertisement video) at a location assisted by an available transcoder function. The trigger may be based on information about the availability of certain localized streaming content and appropriate transcoding functionality in the network at a certain location. This is desired since the user may otherwise access the communication system by means of a bandwidth-constrained technology preventing the data streaming application.

Location/condition subscriptions may cross operator domains and can be provided without a need to deal with each operator separately. However, it is possible that the service provider is realized by a single operator, merely crossing different access technologies that are operated by this operator, e.g., cellular access technologies and the WLAN.

The present invention also enables the definition of such services as enduser services. This is enabled since the mobile user performs the subscriptions.

In the above, it is assumed that the service provider entity 10 has a trust relationship with the network operators. This may not always be required, for example, if the service provider receives the required location information from the user equipment without any intervention by the network operators.

It should be appreciated that whilst embodiments of the present invention have been described in relation to mobile user equipment such as mobile stations, embodiments of the present invention are applicable to any other suitable type of user equipment.

The embodiment of the present invention has been described in the context of a GSM based cellular system. However, it shall be appreciated that, in addition to cellular networks, the invention is applicable also in other networks, like wireless local area networks (WLAN). In the WLAN the base station is often referred to as Access Point. Access Points are further connected to one or more Access Routers. The invention is also applicable to any other access techniques including code division multiple access, frequency division multiple access or time division multiple access as well as any hybrids thereof.

It is also noted herein that while the above describes exemplifying embodiments of the invention, there are several variations and modifications which may be made to the disclosed solution without departing from the scope of the present invention as defined in the appended claims.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of providing a service for a user of user equipment, said user equipment being adapted for communication via a communication system, the method comprising:
   registering in a service provider entity information regarding at least one condition that triggers providing the service for the user by sending a subscription message from the user equipment, said service provider entity being arranged to receive location information regarding user equipment from a plurality of sources;
   receiving at the service provider entity information associated with a location of the user equipment;
   determining a current location of the user equipment at the service provider entity based on said received information;
   verifying at the service provider entity if said at least one condition that triggers providing the service is met by checking if the current location of the user equipment matches the condition sent in the subscription message; and
   providing the service for the user in accordance with the subscription message.

2. The method in accordance with claim 1, wherein a trigger condition comprises an availability of a certain network resource.

3. The method in accordance with claim 2, wherein the certain network resource comprises one of: a used access technology; an available streaming playout buffers; an available transcoder resources.

4. The method in accordance with claim 1, wherein a trigger condition comprises an availability of a certain localized content.

5. The method in accordance with claim 1, wherein the subscription message contains first information that regards a service condition the user equipment subscribes to, second information that regards a validity of the condition and third information that regards the action that shall be taken if the first and second information match information otherwise available for the service provider entity.

6. The method in accordance with claim 5, wherein the three information elements are matched against information stored in the service provider entity.

7. The method in accordance with claim 1, wherein the subscription message contains first information that regards a service condition the user equipment subscribes to, second information that regards operator specific location area and third information that regards the action that shall be taken if the first and second information match information otherwise available for the service provider entity.

8. The method in accordance with claim 7, wherein the three information elements are matched against information stored in the service provider entity.

9. The method in accordance with claim 1, wherein the step of registering comprises sending a Session Initiation Protocol message from the user equipment.

10. The method in accordance with claim 9, wherein said message comprises a Session Initiation Protocol SUBSCRIBE message.

11. The method in accordance with claim 1, comprising sending a Session Initiation Protocol message to the user equipment that a condition is met.

12. The method in accordance with claim 11, wherein said message comprises a Session Initiation Protocol NOTIFY message.

13. A location service entity for providing location dependent services for a user of user equipment, said user equipment being adapted for communication via a communication system, the location service entity comprising:
   a database configured to enable the user to register information regarding at least one condition triggering provisioning of the service for the user by sending a subscription message from the user equipment,
   interface configured to receive location information regarding the user equipment from a plurality of sources associated with different communication systems, and
   a processor configured to determine the current location of the user equipment based on said received location information, for verifying if said at least one condition triggering the service provisioning is met by checking if the current location of the user equipment matches the condition sent in the subscription message, and for providing the service for the user in accordance with the subscription message.

14. The location service entity of claim 13, further comprising a memory for storing information pushed from the plurality of communication systems.

15. The location service entity of claim 13, wherein the interface is adapted to handle messages in accordance with at least one of the following communication protocols: File Transfer Protocol; Session Initiation Protocol; User Datagram Protocol; Internet Control Message Protocol; Simple Network Management Protocol.

16. The location service entity of claim 13, wherein the processor is adapted to trigger a predefined action in response to a predefined result of the location determination and a service subscription by the user equipment.

17. The location service entity of claim 16, wherein the predefined result indicates a change in the location of the user equipment.

18. The location service entity of claim 16, wherein the predefined result indicates that the user equipment is within a certain area.

19. The location service entity of claim 16, wherein the subscription defines at least one trigger condition and at least one location area.

20. The location service entity of claim 16, wherein the processor is adapted to initiate an action in response to detection that a trigger condition is met.

* * * * *